(12) United States Patent
Reynolds

(10) Patent No.: US 12,465,804 B1
(45) Date of Patent: *Nov. 11, 2025

(54) EXERCISE BAR CONNECTOR ASSEMBLY

(71) Applicant: Cap Barbell, Inc., Houston, TX (US)

(72) Inventor: Curt Reynolds, Tomball, TX (US)

(73) Assignee: Cap Barbell, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/214,903

(22) Filed: May 21, 2025

Related U.S. Application Data

(63) Continuation-in-part of application No. 18/658,629, filed on May 8, 2024, now Pat. No. 12,324,945.

(51) Int. Cl.
A63B 21/072 (2006.01)

(52) U.S. Cl.
CPC ...... A63B 21/0722 (2015.10); A63B 21/0724 (2013.01)

(58) Field of Classification Search
CPC .............. A63B 21/072; A63B 21/0722; A63B 21/0724; A63B 2210/50; F16B 7/18; F16B 7/182; F16B 39/38; F16B 21/065; F16B 21/125; F16B 37/043; F16B 37/122; F16B 39/284
See application file for complete search history.

(56) References Cited

U.S. PATENT DOCUMENTS

| | | | | |
|---|---|---|---|---|
| 1,536,048 | A * | 5/1925 | Alastalo | A63B 21/075 482/108 |
| 4,690,400 | A * | 9/1987 | Metz | A63B 21/0724 482/106 |
| 7,510,482 | B2 * | 3/2009 | Benson | A63B 53/00 473/316 |
| 8,047,974 | B1 * | 11/2011 | Kanelos | A63B 21/08 482/106 |
| 11,110,314 | B1 * | 9/2021 | Wineman | A63B 21/0724 |
| 11,369,827 | B2 * | 6/2022 | Jones | A63B 21/0724 |
| 11,857,826 | B2 * | 1/2024 | Freig | A63B 23/0355 |
| 2016/0047405 | A1 * | 2/2016 | Curley | A63B 21/4033 482/139 |
| 2016/0326785 | A1 * | 11/2016 | Hill | F16G 15/08 |
| 2020/0101344 | A1 * | 4/2020 | Jones | A63B 71/0036 |
| 2022/0016464 | A1 * | 1/2022 | Parra Marmolejo | A63B 21/075 |
| 2022/0387843 | A1 * | 12/2022 | Pasternak | A63B 21/4035 |
| 2024/0123277 | A1 * | 4/2024 | Freig | A63B 21/4034 |

* cited by examiner

Primary Examiner — Joshua Lee
(74) Attorney, Agent, or Firm — D'Ambrosio & Menon, PLLC; Usha Menon

(57) ABSTRACT

A connector assembly for an exercise bar having two or more pieces or segments. A first bar segment can include a female end portion. The female end portion has a connector sleeve having a channel extending at least partially through the connector sleeve; a locking opening; and a female threaded portion formed along a portion of an inside wall of the channel. A second bar segment can include a male end portion. The male end portion has a male threaded portion and a pin lock.

17 Claims, 6 Drawing Sheets

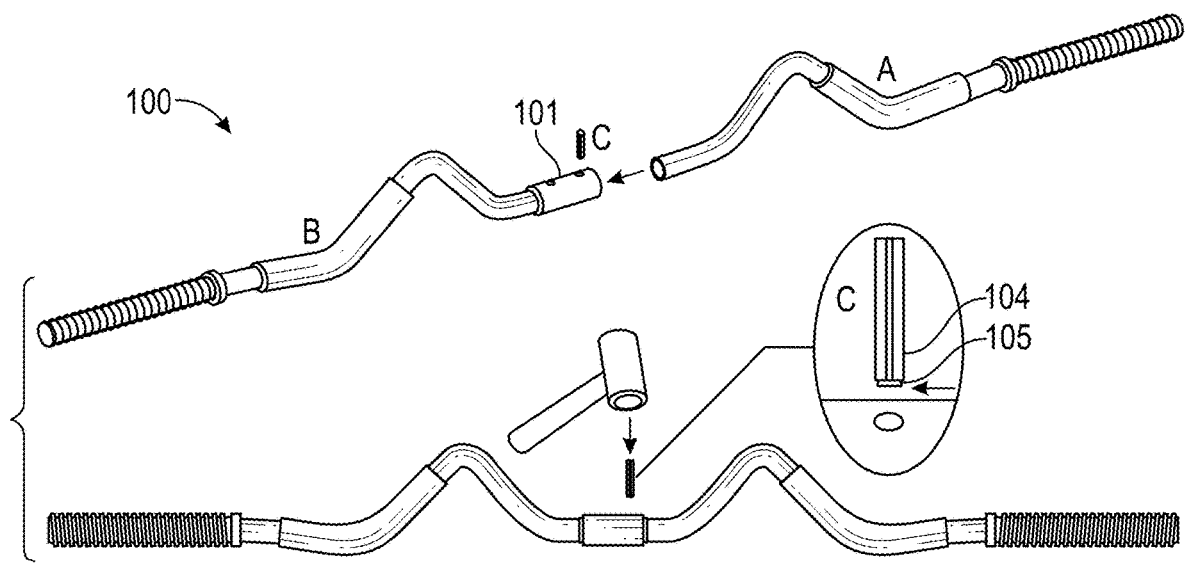
FIG. 1- PRIOR ART
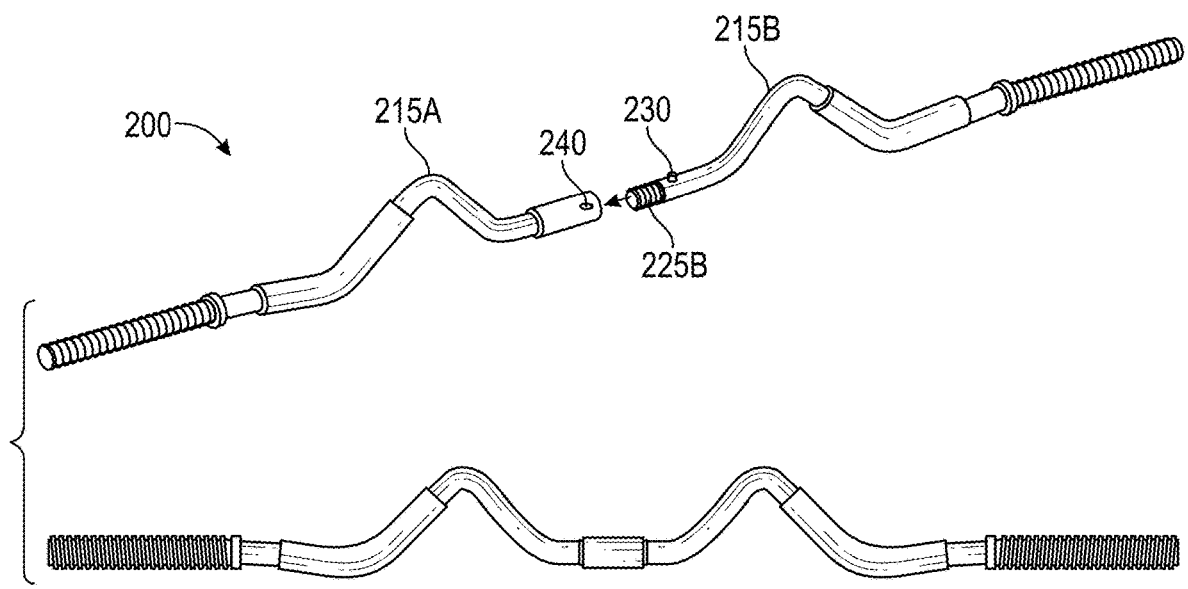
FIG. 2A

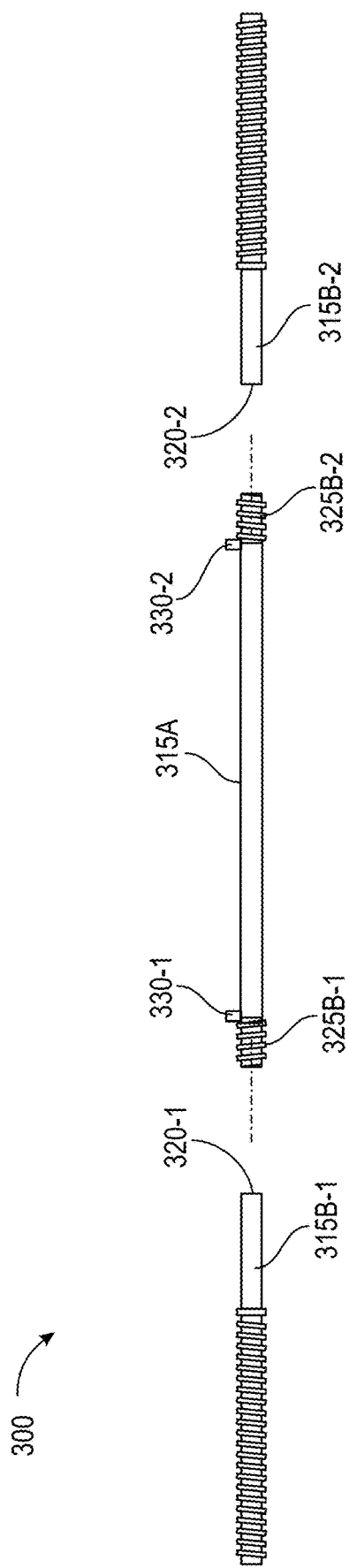
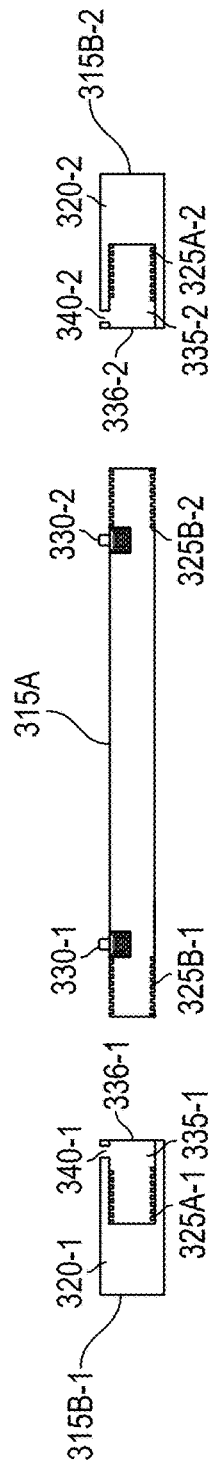
FIG. 3A
FIG. 3B

EXERCISE BAR CONNECTOR ASSEMBLY

CROSS REFERENCE TO RELATED APPLICATION

This application is a continuation-in-part of U.S. patent application Ser. No. 18/658,629 filed on May 8, 2024, the contents of which are incorporated by reference herein.

FIELD OF THE INVENTION

The present invention relates generally to exercise equipment. In particular, it pertains to an improved connector assembly for exercise bars having multiple pieces.

BACKGROUND

The background description includes information that may be useful in understanding the present invention. It is not an admission that any of the information provided herein is prior art or relevant to the presently claimed invention, or that any publication specifically or implicitly referenced is prior art.

Exercise has physical and mental health benefits. Among the various types of exercises, weight training is a form of strength training that aims to develop the strength and size of skeletal muscles. Weight training utilizes the weight force of gravity acting on physical objects to oppose the force generated by muscle. These physical objects are available in a variety of types of specialized equipment. However, weight training equipment must be properly assembled before use.

Exercise bars are commonly used in weight training. Many users prefer to use such free weight exercise bars rather than complex weight-lifting machines. Exercise bars can be used as a weighted fitness bar for personal training, physical therapy and home workouts. Exercise bars can include a single-piece solid bar or multiple segments/pieces/portions that can be connected to each other prior to use. In some cases, it is more convenient to ship or distribute an exercise bar that has two or more segments as opposed to a single-piece (large) exercise bar.

FIG. 1 illustrates a prior art/conventional multi-segmented exercise bar (a curl bar) 100. As shown, exercise bar 100 has two segments, a first bar segment A, and a second bar segment B which are configured to be coupled with a connection assembly C. The connection assembly C includes: (i) a protruding member 101 on segment B having a plurality of through holes/openings, (ii) one or more through holes on a first end of segment A, and (iii) one or more roll pins 104. Typically, the exercise bar 100 is assembled by inserting the first end of segment A within an opening in the protruding member 101 such that at least one of the holes in segment A is aligned with a hole in segment B. This is followed by inserting an end 105 of the roll pin 104 within the aligned holes and hammering it in to join the segments A and B securely.

However, this connection assembly C may be prone to certain issues. For example, after multiple uses and by adding heavy weights to the second ends of segments A and B, the exercise bar 100 may tend to become wobbly as the two segments (A, B) start to loosen up or their connection fails when subjected to repetitive stress/strain of the additional weights. This is because the hammered roll pin does not provide a stable and secure connection between the two segments. This can also lead to accidents where the two segments can disassemble on their own when in use. Also, if the holes on the two segments A and B cannot be perfectly aligned (for instance, if the holes in one or both segments are not machined precisely), it would be difficult to insert the roll pin within the holes and assemble the exercise bar 100.

Therefore, there is a need for an improved connection mechanism for multi-segmented exercise bars. In particular, there is a need for a new connection mechanism that provides a safe and secure connection between one or more exercise bar segments that is capable of substantially withstanding repetitive stress and strain.

SUMMARY

The present invention relates to an improved connector means for exercise bars having two or more pieces/segments. In an embodiment, the exercise bar is a curl bar having at least two segments. In another embodiment, the exercise bar is a straight bar having at least three segments. In another embodiment, the exercise bar is a hex bar having at least three segments. In another embodiment, the exercise bar is a cambered bar having at least three segments. In another embodiment, the exercise bar is a triceps bar having at least three segments. In general, the one or more embodiments of the present application can be utilized with any type of exercise bar that has multiple segments or bar components.

According to an embodiment, a connector assembly for a multi-segmented exercise bar includes: a plurality of exercise bar segments; and a female end portion and a male end portion. The female end portion can be formed along an anterior portion of a first exercise bar segment while the male end portion can be formed along an anterior portion of a second exercise bar. The female end portion includes a connector sleeve having: a channel extending at least partially through the connector sleeve, wherein the channel comprises an opening proximate to its anterior end; a locking opening located proximate to the channel opening; and a female threaded portion formed along a portion of an inside wall of the channel. The female threaded portion can be formed posterior to the locking opening. The male end portion has: a male threaded portion; and a locking mechanism, wherein the locking mechanism is positioned posterior to the male threaded portion. The male threaded portion can be located on an outer surface of the second exercise bar segment. The second exercise bar segment, having the male end portion, is configured for rotational advancement into the first exercise bar segment through the channel opening.

In one or more embodiments, the locking mechanism comprises a pin. The pin can be a spring-loaded pin having a pin head and a spring body connected to the pin head. The locking opening can be sized for securely receiving the pin head therein. The pin head can be flush with an exterior surface of the connector sleeve. The first exercise bar segment and the second exercise bar segment are configured to be coupled to form at least one of a curl bar or a straight bar, or any other suitable exercise bar.

In another embodiment, a connector assembly for a multi-segmented exercise bar includes: a plurality of exercise bar segments; a connector exercise bar segment, and a first and second exercise bar segments. The connector exercise bar segment comprises: a first male end portion formed along an anterior end of the connector exercise bar segment, the first male end portion comprising: a first male threaded portion; and a first locking mechanism, wherein the first locking mechanism is positioned posterior to the first male threaded portion; and a second male end portion formed along a posterior end of the connector exercise bar segment, the second male end portion comprising: a second male threaded portion; a second locking mechanism, wherein the second locking mechanism is positioned posterior to the second male threaded portion. The first exercise bar segment comprises a female end portion formed inside an anterior portion of the first exercise bar segment. The female end portion comprises: a first channel extending at least partially through an anterior end of the first exercise bar segment, the first channel comprising a first channel opening proximate to its anterior end; a first locking opening located proximate to the first channel opening; and a first exercise bar segment female threaded portion formed along a portion of an inside wall of the first channel, the first exercise bar segment female threaded portion formed posterior to the first locking opening. The second exercise bar segment comprises a female end portion formed inside an anterior portion of the second exercise bar segment. The second exercise bar segment female end portion comprises: a second channel extending at least partially through an anterior end of the second exercise bar segment, the second channel comprising a second channel opening proximate to its anterior end; a second locking opening located proximate to the second channel opening; and a second exercise bar segment female threaded portion formed along a portion of an inside wall of the second channel, the second exercise bar segment female threaded portion formed posterior to the second locking opening. The first and second male threaded portions can be located on an outer surface of the connector exercise bar segment. Each of the first and second locking mechanisms comprises a corresponding first spring-loaded pin and a second spring-loaded pin. Each of the first locking opening and the second locking opening is sized for securely receiving a pin head of the corresponding first and second spring-loaded pins. The first and second spring-loaded pins are configured to be flush with an exterior surface of the connector exercise bar segment. The connector exercise bar segment is configured to be coupled to the first and the second exercise bar segments to form at least one of a curl bar or a straight exercise bar.

In yet another embodiment, a connector assembly for a multi-segmented exercise bar includes: a plurality of exercise bar segments; a connector exercise bar segment and a first and second exercise bars. The connector exercise bar segment comprises: (i) a first female end portion formed within an anterior portion of the connector exercise bar segment, comprising: a first channel extending at least partially through an anterior end of the connector exercise bar segment, the first channel comprising a first channel opening proximate to its anterior end; a first locking opening located proximate to the first channel opening; and a first female threaded portion formed along a portion of an inside wall of the first channel, the first female threaded portion formed posterior to the first locking opening; and (ii) a second female end portion formed within a posterior portion of the connector exercise bar segment, the second female end portion comprising: a second channel extending at least partially through a posterior end of the connector exercise bar segment, the second channel comprising a second channel opening proximate to its anterior end; a second locking opening located proximate to the second channel opening; and a second female threaded portion formed along a portion of an inside wall of the second channel, the second female threaded portion formed posterior to the second locking opening. The first exercise bar segment comprises: a first exercise bar segment male end portion located proximate to an anterior end of the first exercise bar segment, comprising: a first exercise bar segment male threaded portion; and a first exercise bar segment locking mechanism, wherein the first exercise bar segment locking mechanism is positioned posterior to the first exercise bar segment male threaded portion. The second exercise bar segment comprises: a second exercise bar segment male end portion located proximate to an anterior end of the second exercise bar segment. The second exercise bar segment male end portion further comprising: a second exercise bar segment male threaded portion; and a second exercise bar segment locking mechanism, wherein the second exercise bar segment locking mechanism is positioned posterior to the second exercise bar segment male threaded portion.

The first exercise bar segment male threaded portion is located on an outer surface of the first exercise bar segment, and the second exercise bar segment male threaded portion is located on an outer surface of the second exercise bar segment. The first exercise bar segment locking mechanism and the second exercise bar segment locking mechanism comprise a corresponding first spring-loaded pin and a second spring-loaded pin. Each of the first locking opening and the second locking opening is sized for securely receiving a pin head of the corresponding first and second spring-loaded pins. The first and second spring-loaded pins are configured to be flush with an exterior surface of connector exercise bar segment. The connector exercise bar segment is configured to be coupled to the first and the second exercise bar segments to form at least one of a curl bar or a straight exercise bar, or any other suitable exercise bar.

Various objects, features, aspects, and advantages of the inventive subject matter will become more apparent from the following detailed description of preferred embodiments and the accompanying drawing figures in which like numerals represent like components.

BRIEF DESCRIPTION OF THE DRAWINGS

FIG. 1 illustrates a multi-segmented exercise bar with conventional connection means.

FIGS. 2A-2C illustrate an exemplary view of a two-segment exercise bar in accordance with an embodiment.

FIGS. 3A-3B illustrate an exemplary view of a three-segment exercise bar with a spring-loaded pin connector assembly in accordance with an embodiment.

DETAILED DESCRIPTION

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases, it will be recognized that references to the "invention" will refer to subject matter recited in one or more, but not necessarily all, of the claims. As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

All methods described herein can be performed in any suitable order unless otherwise indicated herein or otherwise clearly contradicted by context. The use of any and all examples or exemplary language (for example, "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Various terms are used herein. To the extent a term used in a claim is not defined, it should be given the broadest definition persons in the pertinent art have given that term as reflected in printed publications and issued patents at the time of filing.

Figure 2B:
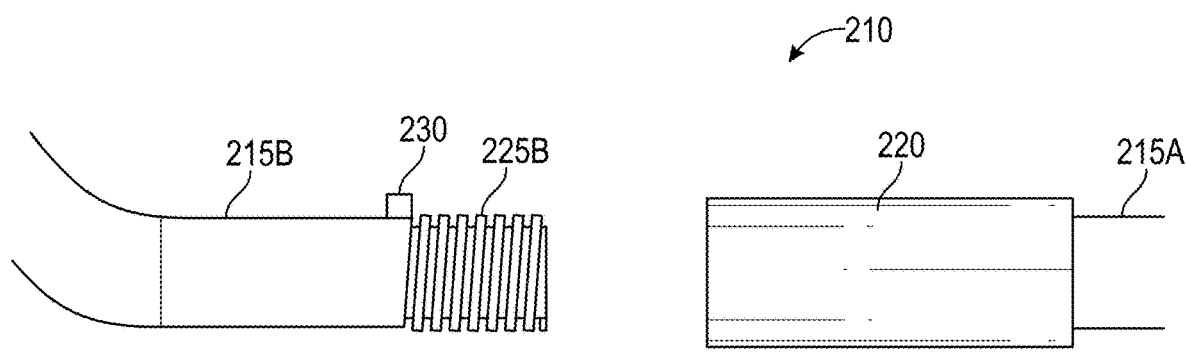

FIG. 2A illustrates an exercise bar 200 having two pieces or segments-a first segment 215A and a second segment 215B. As further illustrated in FIGS. 2B-2C, the two segments can be joined together with an exemplary connector assembly 210 to form a singular/unitary exercise bar. In one embodiment, the two segments 215A and 215B can joined to form a curl bar. A curl bar is a type of barbell with a curved shape. However, it is understood that the two segments can be joined to form a straight exercise bar or an exercise bar of a different shape. Additionally, it is understood that the two segments can have any shape or any number of pieces that can be connected to form a singular/unitary piece of exercise equipment.

The connector assembly 210 can include a female end portion formed along an anterior portion of the first exercise bar segment 215A and a male end portion located along an anterior portion of the second exercise bar segment 215B. However, it is understood that the female end portion can be formed on the anterior portion of the second exercise bar segment 215B and the male end portion can be formed on the anterior portion of the first exercise bar segment 215A.

The female end portion can include a connector sleeve 220. The connector sleeve 220 can be pre-formed/pre-moulded onto or coupled to the anterior portion of the first bar segment 215A. The connector sleeve 220 can be tubular or have any other desired shape. The connector sleeve 220 can be formed with the same material as the bar segments 215A and 215B, or it can be formed of any other suitable material.

Figure 2C:
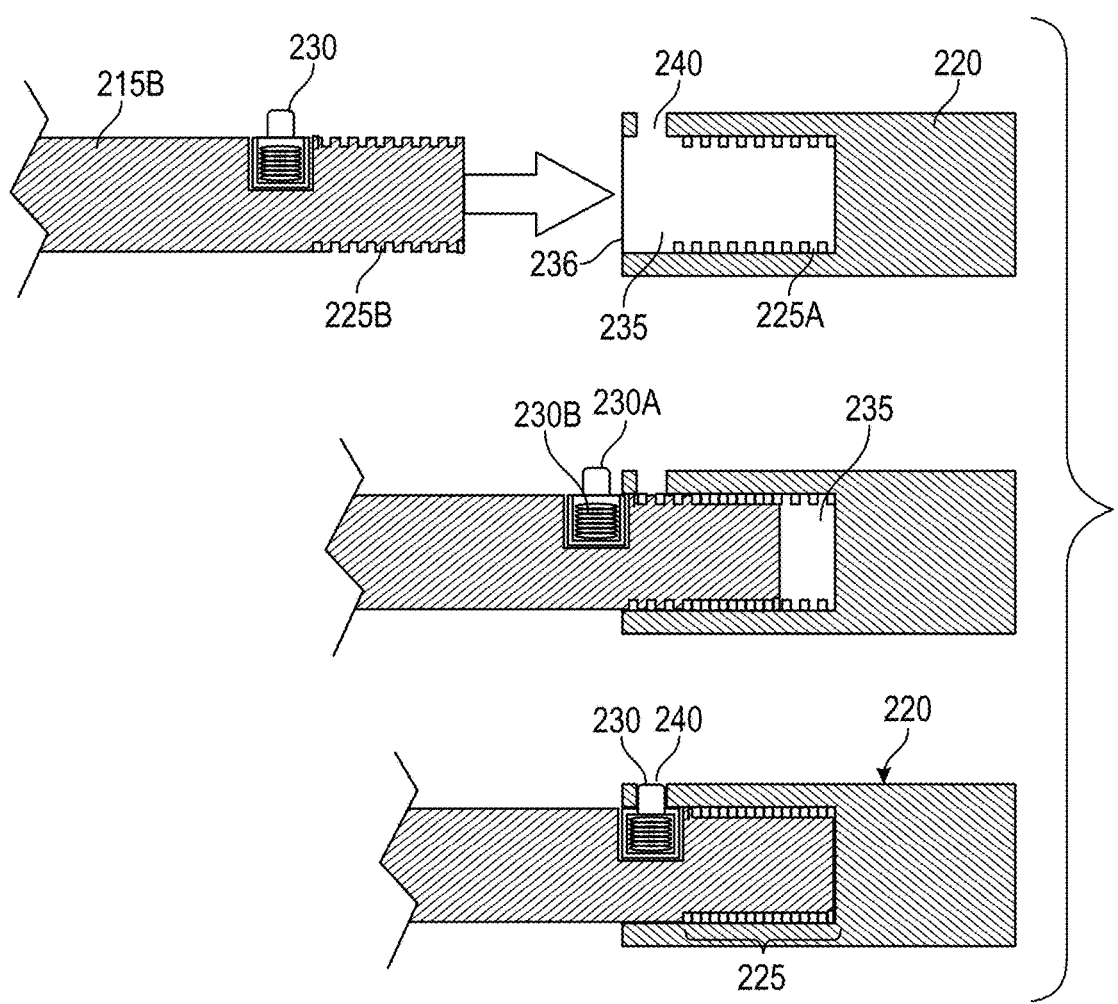

A channel 235 extends horizontally through at least a portion of the connector sleeve 220. Channel 235 has an opening or aperture 236 at its anterior end for receiving the male end portion of the second exercise segment 215B. The inner diameter of the channel 235 is slightly larger (for instance, a few millimetres more) than the outer diameter of the male end portion of the second exercise bar segment 215B such that, as shown in FIG. 2C, the male end portion of the second exercise bar segment 215B can be inserted within the channel opening 236.

The connector sleeve 220 has a female engagement structure. The engagement structure can include: (i) a pin locking opening 240 formed along an inside wall of the sleeve 220 and extending to the exterior surface of the connector sleeve 220; and (ii) a female threaded portion 225A formed along a portion of an inside wall of the channel 235 and which is further located posterior to the pin locking opening 240. The pin locking opening 240 can be located proximate to the channel opening 236. The female threaded portion 225A can include, without limitation, one or more female threads that run substantially between the pin locking opening 240 and a posterior end of the channel 235 in the first exercise bar segment 215A.

The male end portion can include a male engagement structure having: (i) a locking mechanism, such as, a button or a pin 230; and (ii) a male threaded portion 225B formed along the outer surface of the anterior end of the second exercise bar segment 215B. The pin 230 is configured with depressible means. In one embodiment, the pin can be a spring-loaded pin 230. The spring-loaded pin 230 can be positioned posterior to the male threaded portion 225B. The male threaded portion 225B can include, without limitation, one or more male threads that run substantially between the anterior end of the second exercise bar segment 215B and the spring-loaded pin 230. The male threaded portion 225B is configured to be complementary to the female threaded portion 225A. The terms "male thread" and "female thread" are known in the art.

The spring-loaded pin 230 includes a pin head 230A which can be coupled to a spring body 230B. The pin head 230A can be disposed above a surface of the second exercise bar segment 215B while the spring body 230B can be located in a recess formed on an outer surface of the second exercise bar segment 215B.

Prior to using the exercise bar 200, the first exercise bar segment 215A can be connected to the second bar segment 215B to form a unitary bar. In an exemplary embodiment, the male threaded portion 225B is configured to be slidably inserted into the channel opening 236 in response to a rotational movement of the second exercise bar segment 215B in a first direction (such as, in a counterclockwise direction). The rotational movement is continued until the end of the male threaded portion 225B abuts the channel opening 236. At this point, the pin head 230A is manually depressed so that the spring 230B can be compressed and the spring-loaded pin 230 slides within the channel opening 236. When the pin 230 aligns with the pin locking opening 240, the spring 230B is automatically released, and the pin head 230A ejects to be locked inside the pin locking opening 240. As such, the pin head 230A is now level or slightly lower than the exterior surface of the connector sleeve 220. Further, the male threaded portion 225B threadedly engages with the female threaded portion 225A to form a tightly threaded arrangement 225. The pin locking opening 240 is sized to securely receive the pin head 230A and lock the pin 230. Advantageously, due to the combination of the threaded engagement 225 and the spring-loaded pin 230 secured within the pin locking opening 240, a secure connection is formed between the exercise bar segments 215A and 215B. This secure connection can be strong enough to withstand prolonged use of the exercise bar, and the addition of heavy weights to the posterior ends of the exercise bar. This reduces the risk of accidents due to uncoupling of the exercise bar segments.

In one embodiment, once the pin head 230A is securely lodged in the opening 240, and a unitary exercise bar is assembled (as shown in FIG. 2A), the two exercise bar segments 215A and 215B can be disconnected by dislodging the pin head 230A from the opening 240. In this embodiment, the pin head 230A once secured within the opening 240 can be level with the outside surface of the sleeve 220. In another embodiment, the pin head 230A can extend to a height slightly lower than the outside surface of the sleeve 220. In an example, the pin head 230A extending to a height slightly lower than the outside surface of the sleeve 220 allows a secure connection that will not be accidently pressed during use of the exercise bar.

Accordingly, the opening 240 can be formed on an outer surface of the connector sleeve 220 proximate to the pin locking opening 240. By depressing the pin head 230A through the opening, the spring 230B is compressed, and the spring-loaded pin 230 can get released from the pin locking opening 240. At this stage, by rotating the male end portion in a second rotational direction (for instance, a clockwise direction) that is opposite to the first rotational direction, the male threaded portion 225B can be disengaged from the female threaded portion 225A and the two segments 215A and 215B can be disassembled/disconnected to ensure portability, and for convenient storage or transportation.

In one embodiment, the connector assembly 210 or the connector sleeve 220 can be provided as a separate component(s) that can be assembled to the anterior end(s) of the bar segments 215A, 215B prior to use.

FIG. 3A illustrates an embodiment of an exercise bar 300 having three segments 315A, 315B-1 and 315B-2. As shown in FIGS. 3A-3B, a connector exercise bar segment 315A can be coupled to a first and second exercise bar segments, 315B-1 and 315B-2, to form a unitary exercise bar 300.

Connector exercise bar segment 315A can be configured to have an anterior and posterior male end portion. As described earlier with reference to FIGS. 2A-2C, the anterior and posterior male end portions can include a corresponding male engagement structure having: (i) a locking mechanism, such as, a button or a pin, 330-1 and 330-2; and (ii) a male threaded portion 325B-1 and 325B-2 formed along the outer surface of the anterior and posterior ends of the connector exercise bar segment 315A. The pins 330-1 and 330-2 can be configured with depressible means. In one embodiment, the pins can be spring-loaded pins 330-1 and 330-2. The pins 330-1 and 330-2 can have a spring body and a depressible button. The spring-loaded pins 330-1 and 330-2 can be positioned posterior to the male threaded portions 325B-1 and 325B-2. The male threaded portions 325B-1 and 325B-2 can include, without limitation, one or more male threads that run substantially between the anterior and posterior ends of the connector exercise bar segment 315A and the spring-loaded pins 330-1, 330-2.

The exercise bar segments 315B-1 and 315B-2 include female engagement structures located around their corresponding anterior end portions 320-1, 320-2. Exercise bar segments 315B-1 and 315B-2 can be substantially similar to each other. In one embodiment, at least a portion of the anterior portion of each exercise bar segment, 315B-1 and 315B-2, has a central internal channel 335-1, 335-2. The inside of channel walls 335-1 and 335-2 includes female threaded portions, 325A-1 and 325A-2, and corresponding pin locking openings 340-1 and 340-2 for receiving pins 330-1 and 330-2.

Prior to use, as discussed with reference to FIGS. 2A-2C, the three exercise bar segments—315A, 315B-1 and 315B-2—are coupled together by inserting the first male threaded portion 325B-1 within channel opening 336-1 and the second male threaded portion 325B-2 is inserted within channel opening 336-2. When the pins 330-1 and 330-2 align with the corresponding pin locking openings 340-1 and 340-2 formed inside the channels 335-1 and 335-2, the springs coupled to pins 330-1 and 330-2 are released, and the pin heads of pins 330-1 and 330-2 eject to be locked within the corresponding openings 340-1 and 340-2. Additionally, the first male threaded portion 325B-1 engages with the female threaded portion 325A-1 on bar segment 315B-1 while the second male threaded portion 325B-2 engages with the female threaded portion 325A-2 on bar segment 315B-2 to form a threaded secure connection.

Figure 3C:
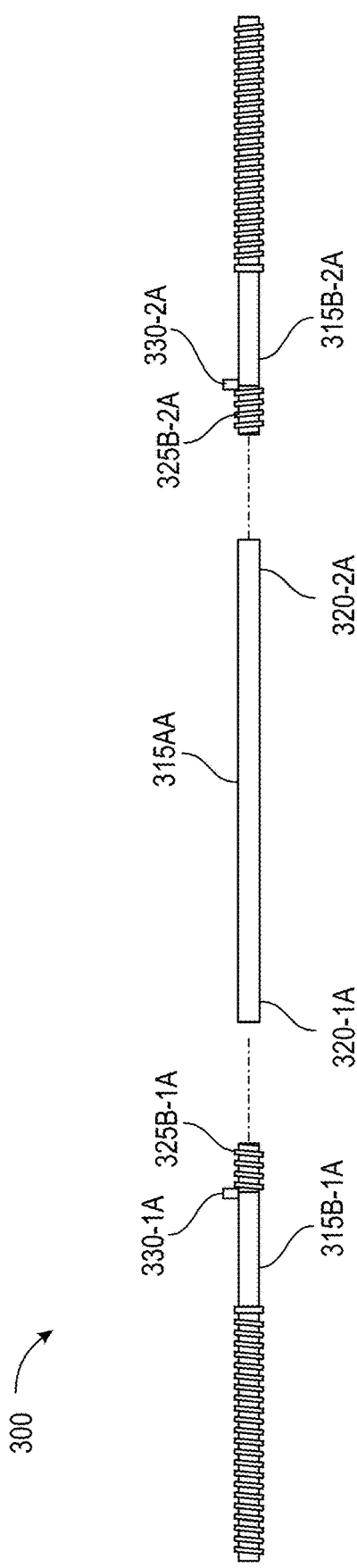
FIGS. 3C-3D illustrate an exemplary view of a three-segment exercise bar with a spring-loaded pin connector assembly in accordance with another embodiment.
Figure 3D:
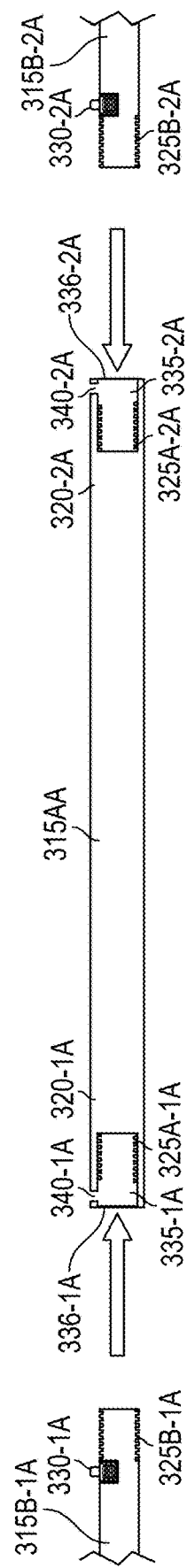

In an alternate embodiment, as shown in FIGS. 3C-3D, a first female engagement structure is arranged on an inside surface of an anterior end 320-1A of a connector exercise bar 315AA, while a second female engagement structure is arranged on an inside surface of a posterior end 320-2A of the connector exercise bar. At least an anterior and a posterior end portion of the connector exercise bar segment 315AA has channels, 335-1A and 335-2A. Each female engagement structure further includes pin locking openings 340-1A and 340-2A and one or more female threads 325A-1A and 325A-2A located posterior to the corresponding pin locking openings.

Exercise bar segments 315B-1A and 315B-2A include a male engagement structure arranged around their anterior end portions. The male engagement structures include corresponding spring-loaded pins 330-1A and 330-2A and corresponding male threaded portions 325B-1A and 325B-2A. The male threaded portions can include, without limitation, one or more male threads.

As described with reference to FIGS. 3A-3B, prior to use, the three exercise bar segments of FIGS. 3C-3D-315AA, 315B-1A and 315B-2A—are coupled together by inserting the first male threaded portions 325B-1A within channel opening 336-1A and the second male threaded portion 325B-2A is inserted within channel opening 336-2A. When the pins 330-1A and 330-2A align with the corresponding pin locking openings 340-1A and 340-2A formed inside the channels 335-1A and 335-2A, the springs coupled to pins 330-1A and 330-2A are released, and the pin heads of pins 330-1A and 330-2A eject to be locked inside the corresponding openings 340-1A and 340-2A. Additionally, the first male threaded portion 325B-1A engages with the female threaded portion 325A-1A on connector bar segment 315AA while the second male threaded portion 325B-2A engages with the female threaded portion 325A-2A on connector bar segment 315AA to form a threaded secure connection.

Figure 4:
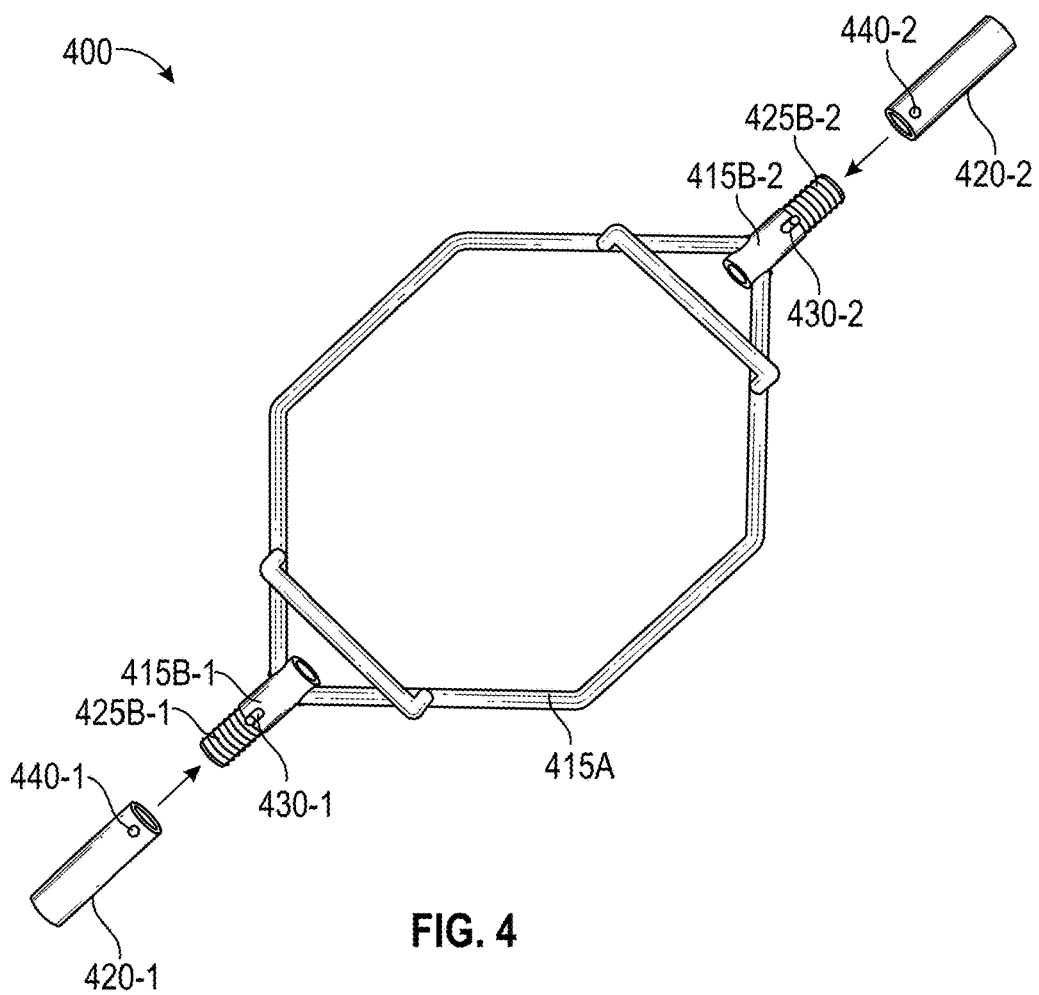
FIG. 4 illustrates an exemplary view of a three-segment hex exercise bar with a pin connector assembly in accordance with another embodiment.

FIG. 4 illustrates an exemplary view of a three-segment hex exercise bar 400 with a pin connector assembly in accordance with another embodiment. The hex bar 400 can be a three-segment assembly utilizing the spring-loaded pin connector assembly as described herein. As shown in FIG. 4, prior to use, the three exercise bar segments are coupled together by inserting the first male threaded portion 425B-1 within channel opening on the sleeve 420-1 and the second male threaded portion 425B-2 is inserted within channel opening on the sleeve 420-2 to create a unitary hex exercise bar.

Additionally, the three-segment hex exercise bar 400 with a spring-loaded pin connector assembly has the anterior and posterior male end portions, which can include a corresponding male engagement structure having: (i) a locking mechanism, such as, a button or a pin, 430-1 and 430-2; and (ii) a male threaded portion 425B-1 and 425B-2 formed along the outer surface of the anterior and posterior ends of the connector hex exercise bar segment 415A. The pins 430-1 and 430-2 can be configured with depressible means, such that the pins 430-1 and 430-2 can be depressed through the pin locking openings 440-1 and 440-2. This allows the user to selectively disassemble the three-segment hex exercise bar 400.

In an embodiment, the pin head 430-1, 430-2 once secured within the opening 440-1, 440-2 can be level with the outside surface of the sleeve 420-1, 420-2. In another embodiment, the pin head 430-1, 430-2 can extend to a height slightly lower than the outside surface of the sleeve 420-1, 420-2. In an example, the pin head 430-1, 430-2 extending to a height slightly lower than the outside surface of the sleeve 420-1, 420-2 allows a secure connection that will not be accidently pressed during use of the exercise bar.

Figure 5:
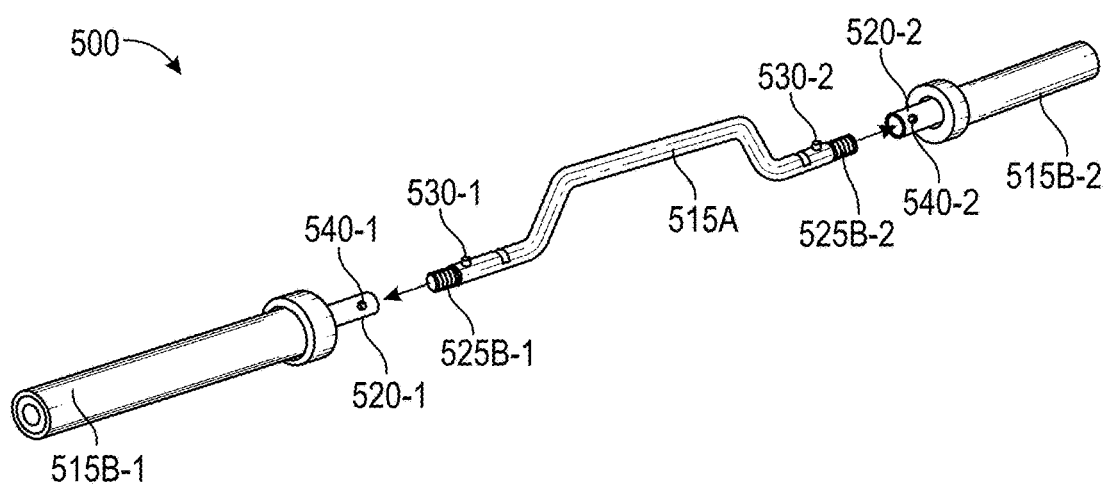
FIG. 5 illustrates an exemplary view of a three-segment cambered exercise bar with a pin connector assembly in accordance with another embodiment.
Figure 6:
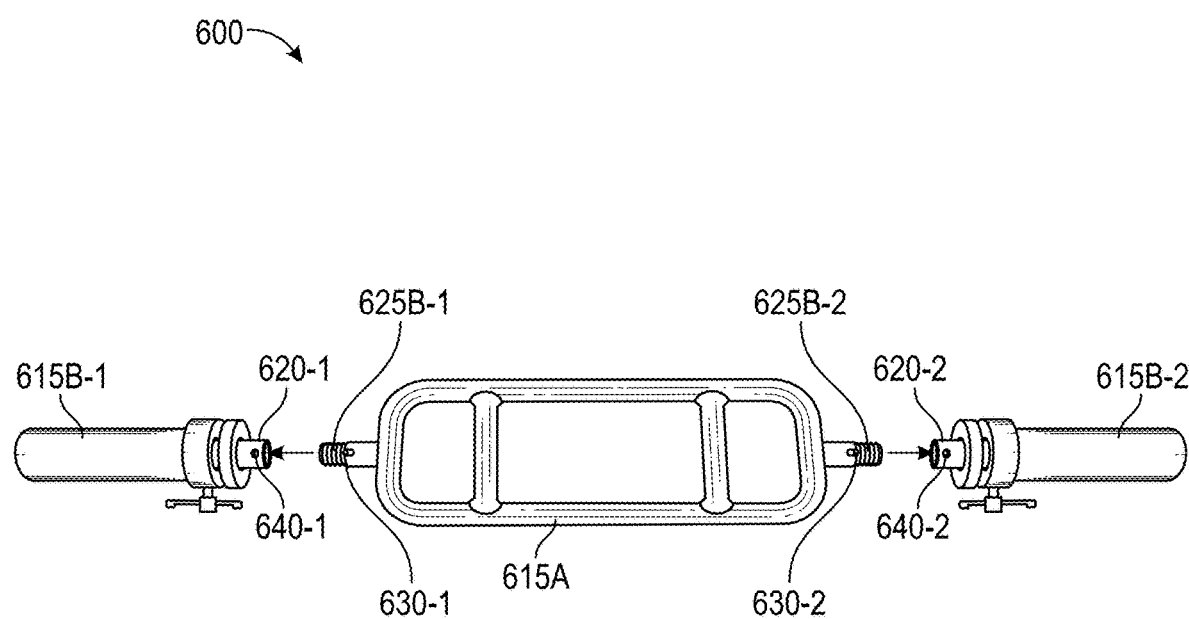
FIG. 6 illustrates an exemplary view of a three-segment triceps exercise bar with a pin connector assembly in accordance with another embodiment.

Similar to FIG. 4, FIGS. 5 and 6 illustrate exemplary views of a three-segment cambered exercise bar 500 and a three-segment triceps exercise bar 600 with a connector assembly, respectively. The additional embodiments exemplify the variety of exercise bar shapes that can use the connector assembly to create a unitary exercise bar when desired but can be disassembled for ease of storage. Accordingly, the three exercise bar segments are coupled together by inserting the first male threaded portions 525B-1, 625B-1 within channel opening on the sleeve 520-1, 620-1 and the second male threaded portion 525B-2, 625B-2 is inserted within channel opening on the sleeve 520-2, 620-2 to create a unitary exercise bar. The three-segment exercise bars 500, 600 with a spring-loaded pin connector assembly has the anterior and posterior male end portions, which can include a corresponding male engagement structure having: (i) a locking mechanism, such as, a button or a pin, 530-1, 630-1 and 530-2, 630-2; and (ii) a male threaded portion 525B-1, 625B-1 and 525B-2, 625B-2 formed along the outer surface of the anterior and posterior ends of the connector exercise bar segments 515A, 615A. The pins 530-1, 630-1 and 530-2, 630-2 can be configured with depressible means, such that the pins 530-1, 630-1 and 530-2, 630-2 can be depressed through the pin locking openings 540-1, 640-1 and 540-2, 640-2. This allows the user to selectively assemble and disassemble the three-segment exercise bars 500, 600.

In an embodiment, the pin head 530-1, 530-2, 630-1, 630-2 once secured within the opening 540-1, 540-2, 640-1, 640-2, can be level with the outside surface of the sleeve 520-1, 520-2, 620-1, 620-2. In another embodiment, the pin head 530-1, 530-2, 630-1, 630-2 can extend to a height slightly lower than the outside surface of the sleeve 520-1, 520-2, 620-1, 620-2. In an example, the pin head 530-1, 530-2, 630-1, 630-2 extending to a height slightly lower than the outside surface of the sleeve 520-1, 520-2, 620-1, 620-2 allows a secure connection that will not be accidently pressed during use of the exercise bar.

The exercise bars 200, 300, 400, 500, and 600 can be made of durable and sturdy materials, such as steel or other suitable materials. As known in the art, the exercise bars 200, 300, 400, 500, and 600 can include a gripping section and a posterior end configured to receive weight plates or other weights known in the art.

The exercise bar with the secure connector assembly described herein may be sold wherever traditional exercise bars are sold as well as wherever exercise equipment generally is sold. The exercise bar with a secure connector assembly of the present invention can be sold individually or with additional other products, including but not limited to weight plates, dumbbells, kettlebells, jump ropes, fitness mats, wrist or ankle weights, and resistance bands. The exercise bar with a secure connector assembly of the present invention can also be sold with access to preprogrammed workouts. For instance, the preprogrammed workouts could be accessed via manual input on a smart device, such as a smartphone, tablet, or computer, or via a smart home device. The exercise bar with a secure connector assembly of the present invention can be sold with instruction sheets illustrating a method of use of the device along with various workouts that can be carried out using the device.

While the foregoing describes various embodiments of the invention, other and further embodiments of the invention may be devised without departing from the basic scope thereof. The scope of the invention is determined by the claims that follow. The invention is not limited to the described embodiments, versions, or examples, which are included to enable a person having ordinary skill in the art to make and use the invention when combined with information and knowledge available to the person having ordinary skill in the art.

The invention claimed is:

1. A connector assembly for a multi-segmented exercise bar, comprising:
    a plurality of exercise bar segments;
    a female end portion, the female end portion formed along an anterior portion of a first exercise bar segment, the female end portion comprising:
        a connector sleeve, the connector sleeve comprising:
            a channel extending at least partially through the connector sleeve, the channel comprising an opening proximate to its anterior end;
            a locking opening located proximate to the channel opening; and
            a female threaded portion formed along a portion of an inside wall of the channel, the female threaded portion formed posterior to the locking opening; and
    a male end portion, the male end portion located proximate to an anterior end of a second exercise bar segment, the male end portion comprising:
        a male threaded portion; and
        a locking mechanism, wherein the locking mechanism is positioned posterior to the male threaded portion, wherein the pin head is level with an outside surface of the connector sleeve.

2. The connector assembly according to claim 1, wherein the male threaded portion is located on an outer surface of the second exercise bar segment.

3. The connector assembly according to claim 1, wherein the second exercise bar segment is configured for rotational advancement into the first exercise bar segment through the channel opening.

4. The connector assembly according to claim 1, wherein the locking mechanism comprises a pin.

5. The connector assembly according to claim 4, wherein the pin comprises a spring-loaded pin, wherein the pin comprises a pin head and a spring body connected to the pin head.

6. The connector assembly according to claim 5, wherein the locking opening is sized for securely receiving the pin head therein.

7. The connector assembly according to claim 1, wherein the first exercise bar segment and the second exercise bar segment are configured to be coupled to form at least one of a curl bar, hex bar, triceps bar, cambered bar, or a straight bar.

8. A connector assembly for a multi-segmented exercise bar, comprising:
    a plurality of exercise bar segments;

a connector exercise bar segment, wherein the connector exercise bar segment comprises:
(ii) a first male end portion formed along an anterior end of the connector exercise bar segment, the first male end portion comprising:
a first male threaded portion; and
a first locking mechanism, wherein the first locking mechanism is positioned posterior to the first male threaded portion; and
(ii) a second male end portion formed along a posterior end of the connector exercise bar segment, the second male end portion comprising:
a second male threaded portion; and
a second locking mechanism, wherein the second locking mechanism is positioned posterior to the second male threaded portion;
a first exercise bar segment, wherein the first exercise bar segment comprises a female end portion formed inside an anterior portion of the first exercise bar segment, the first exercise bar segment female end portion comprising:
a first channel extending at least partially through an anterior end of the first exercise bar segment, the first channel comprising a first channel opening proximate to its anterior end;
a first locking opening located proximate to the first channel opening; and
a first (exercise bar segment) female threaded portion formed along a portion of an inside wall of the first channel, the first (exercise bar segment) female threaded portion formed posterior to the first locking opening; and
a second exercise bar segment, wherein the second exercise bar segment comprises a female end portion formed inside an anterior portion of the second exercise bar segment, the second exercise bar segment female end portion comprising:
a second channel extending at least partially through an anterior end of the second exercise bar segment, the second channel comprising a second channel opening proximate to its anterior end;
a second locking opening located proximate to the second channel opening; and
a second (exercise bar segment) female threaded portion formed along a portion of an inside wall of the second channel, the second (exercise bar segment) female threaded portion formed posterior to the second locking opening,
wherein the pin head is level with an outside surface of the connector sleeve.

9. The connector assembly according to claim 8, wherein the first and second male threaded portions are located on an outer surface of the connector exercise bar segment.

10. The connector assembly according to claim 8, wherein each of the first and second locking mechanisms comprises a corresponding first spring-loaded pin and a second spring-loaded pin.

11. The connector assembly according to claim 10, wherein each of the first locking opening and the second locking opening is sized for securely receiving a pin head of the corresponding first and second spring-loaded pins.

12. The connector assembly according to claim 8, wherein the connector exercise bar segment is configured to be coupled to the first and the second exercise bar segments to form at least one of a curl bar, hex bar, triceps bar, cambered bar, or a straight exercise bar.

13. A connector assembly for a multi-segmented exercise bar, comprising:
a plurality of exercise bar segments;
a connector exercise bar segment, wherein the connector exercise bar segment comprises:
(i) a first female end portion formed within an anterior portion of the connector exercise bar segment, the first female end portion comprising:
a first channel extending at least partially through an anterior end of the connector exercise bar segment, the first channel comprising a first channel opening proximate to its anterior end;
a first locking opening located proximate to the first channel opening; and
a first female threaded portion formed along a portion of an inside wall of the first channel, the first female threaded portion formed posterior to the first locking opening; and
(ii) a second female end portion formed within a posterior portion of the connector exercise bar segment, the second female end portion comprising:
a second channel extending at least partially through a posterior end of the connector exercise bar segment, the second channel comprising a second channel opening proximate to its anterior end;
a second locking opening located proximate to the second channel opening; and
a second female threaded portion formed along a portion of an inside wall of the second channel, the second female threaded portion formed posterior to the second locking opening; and
a first exercise bar segment, wherein the first exercise bar segment comprises a first exercise bar segment male end portion located proximate to an anterior end of the first exercise bar segment, the first exercise bar segment male end portion comprising:
a first (exercise bar segment) male threaded portion; and
a first (exercise bar segment) locking mechanism, wherein the first (exercise bar segment) locking mechanism is positioned posterior to the first (exercise bar segment) male threaded portion; and
a second exercise bar segment, wherein the second exercise bar segment comprises a second exercise bar segment male end portion located proximate to an anterior end of the second exercise bar segment, the second exercise bar segment male end portion comprising:
a second (exercise bar segment) male threaded portion; and
a second (exercise bar segment) locking mechanism, wherein the second (exercise bar segment) locking mechanism is positioned posterior to the second (exercise bar segment) male threaded portion,
wherein the pin head is level with an outside surface of the connector sleeve.

14. The connector assembly according to claim 13, wherein the first (exercise bar segment) male threaded portion is located on an outer surface of the first exercise bar segment, and wherein the second (exercise bar segment) male threaded portion is located on an outer surface of the second exercise bar segment.

15. The connector assembly according to claim 13, wherein the first (exercise bar segment) locking mechanism and the second (exercise bar segment) locking mechanism comprise a corresponding first spring-loaded pin and a second spring-loaded pin.

16. The connector assembly according to claim 15, wherein each of the first locking opening and the second locking opening is sized for securely receiving a pin head of the corresponding first and second spring-loaded pins.

17. The connector assembly according to claim 13, wherein the connector exercise bar segment is configured to be coupled to the first and the second exercise bar segments to form at least one of a curl bar, hex bar, triceps bar, cambered bar, or a straight exercise bar.

* * * * *